H. B. ELLSWORTH.
SPLIT PULLEY.
APPLICATION FILED OCT. 30, 1916.
1,234,744.
Patented July 31, 1917.
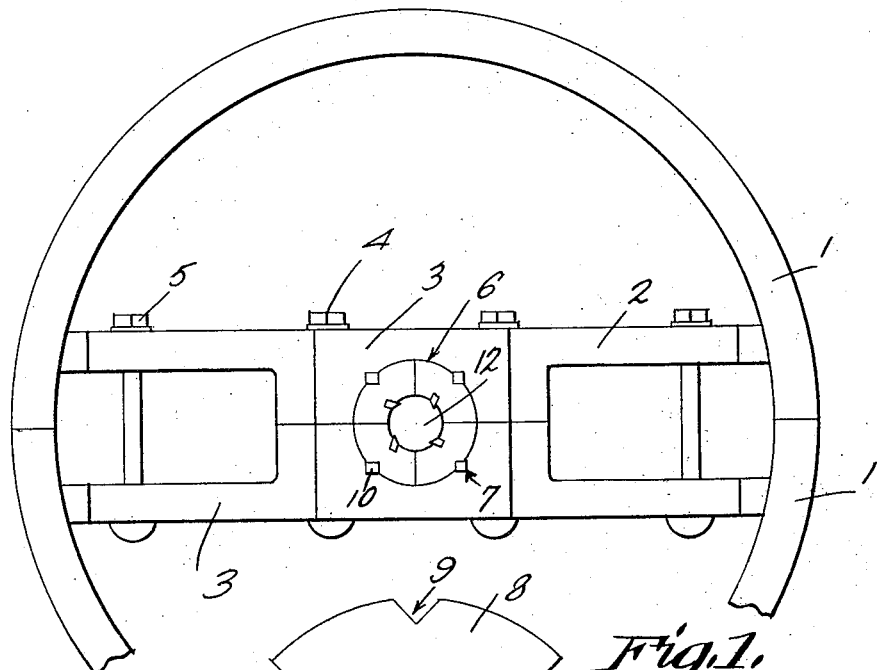
Fig.1.
Fig.2.
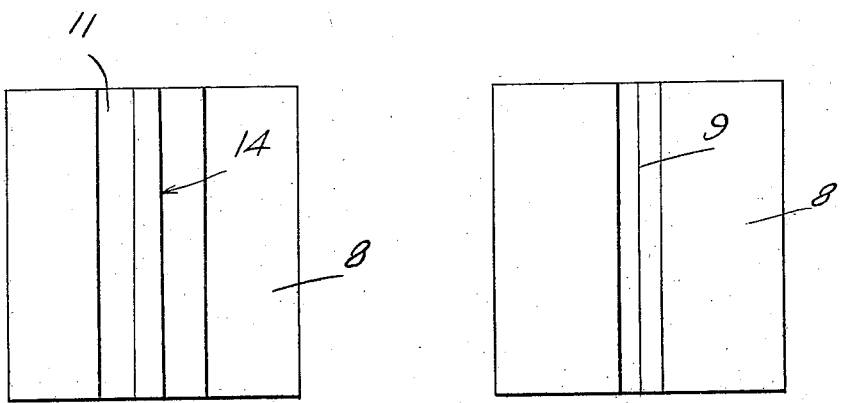
Fig.3.
Fig.4.
Witnesses
H.B.Ellsworth, Inventor
by C.A.Snow & Co.
Attorneys

UNITED STATES PATENT OFFICE.

HARRY BUXTON ELLSWORTH, OF COOK, MINNESOTA.

SPLIT PULLEY.

1,234,744.  Specification of Letters Patent.  Patented July 31, 1917.

Application filed October 30, 1916. Serial No. 128,559.

*To all whom it may concern:*

Be it known that I, HARRY B. ELLSWORTH, a citizen of the United States, residing at Cook, in the county of St. Louis and State of Minnesota, have invented a new and useful Split Pulley, of which the following is a specification.

The device forming the subject matter of this application is a split pulley, and the invention aims to provide novel means whereby a bushing carried by the hub of the pulley will be given a hold on the shaft which carries the pulley.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in side elevation, a portion of a split pulley embodying the present invention, parts being broken away;

Fig. 2 is an end elevation showing one member of the bushing;

Fig. 3 is a bottom plan of the structure shown in Fig. 2; and

Fig. 4 is a top plan of the structure shown in Fig. 2.

In Fig. 1 of the drawings there is shown a split pulley of usual construction, embodying rim parts 1 connected adjacent their ends by cross arms 2 including hub forming parts 3. The hub forming parts 3 are united by bolts 4, and the cross arms 2 are united by bolts 5, all as common in the art, and meriting no specific or extended description.

The hubs 3 are provided with recesses coöperating to form an opening 6. In the hub parts 3, about the circumference of the opening 6, V-shaped seats 7 are formed. Mounted in the opening 6 is a bushing made up of any desired number of parts 8, the parts 8 of the bushing being supplied in their exterior faces with V-shaped seats 9 coöperating with the seats 7. In the seats 7 and 9 are mounted keys 10. The inner faces of the parts 8 of the bushing are curved as shown at 11, to define an opening in which a shaft 12 is received. In the inner curved faces 11 of the parts 8 of the bushing are formed longitudinal grooves 14 which are not disposed radially of the bushing, but are inclined, as shown in Fig. 2. In these grooves are seated retainers 20, the inner faces of which are inclined as shown at 15, to form sharpened edges 16 which, when the bolts 4 and 5 are tightened up, bite into the shaft 12 and enable the pulley to obtain a secure hold thereon. The retainers 20 preferably are made of tool steel. As shown in Fig. 3, the grooves 14 taper from one end to the other, and the retainers 20 are shaped accordingly, so that they may be driven to a firm seat in the grooves. The construction, obviously is such that the sharpened edges 16 of the retainers 20 will constitute an important means whereby the pulley may be connected with the shaft 12, for simultaneous rotation therewith.

It has been pointed out hereinbefore that by tightening up the bolts 4 and 5, the sharpened edges 16 of the retainers 20 may be made to engage the shaft 12. It is possible, however, to assemble the pulley on the shaft 12 and then drive the retainers endwise into place.

Having thus described the invention, what is claimed is:—

In a device of the class described, a pulley having an opening; a shaft in the opening; and a bushing in the opening and surrounding the shaft, the bushing being provided in its inner face with laterally slanting rectangular seats which taper from end to end; and rectangular retainers in the seats, the retainers having beveled faces merging at one end into the inner curve of the bushing, and coöperating at their other ends with one of the side faces of the retainers, to form sharpened edges which bite into the shaft.

In testimony that I claim the foregoing as my own, I have hereto affixed my signature in the presence of two witnesses.

HARRY BUXTON ELLSWORTH.

Witnesses:
 N. LONGFELLER,
 C. H. ALCOCK.

Copies of this patent may be obtained for five cents each, by addressing the "Commissioner of Patents, Washington, D. C."